United States Patent [19]

Nakasu

[11] 4,225,194
[45] Sep. 30, 1980

[54] SAFETY DEVICE FOR A DOUBLE-CIRCUIT TYPE AIR BRAKE FOR A VEHICLE

[75] Inventor: Kei Nakasu, Toyota, Japan

[73] Assignee: Toyota Jidosha Kogyo Kabushiki Kaisha, Aichi, Japan

[21] Appl. No.: 937,454

[22] Filed: Aug. 28, 1978

[30] Foreign Application Priority Data

Feb. 13, 1978 [JP] Japan .................................. 53-15110
Apr. 21, 1978 [JP] Japan .................................. 53-48212

[51] Int. Cl.³ .............................................. B60T 15/46
[52] U.S. Cl. .............................. 303/84 A; 188/151 A; 303/13; 303/52
[58] Field of Search ............. 303/84, 52, 13, 9, 10–12, 303/19, 6 A, 6 R; 188/151 A, 355; 137/110

[56] References Cited

U.S. PATENT DOCUMENTS

| 3,278,242 | 10/1966 | Nakamura | 303/84 A X |
| 3,393,018 | 7/1968 | Fites | 303/84 A |
| 3,801,162 | 4/1974 | Masuda et al. | 303/10 X |
| 4,054,327 | 10/1977 | Rebenstorf | 303/84 R |

FOREIGN PATENT DOCUMENTS 163077 5/1949 Austria .
703868 3/1941 Fed. Rep. of Germany .
1113797 3/1958 France .
1233846 6/1971 United Kingdom .

Primary Examiner—Douglas C. Butler
Attorney, Agent, or Firm—Browdy and Neimark

[57] ABSTRACT

A safety device for a double-circuit type air brake, wherein compressed air is supplied from one compressor to a pair of air reservoirs, through a check valve in each respective route, featured in inserting a safety device in an upstream portion of the double-circuit brake system, i.e., nearer to the compressor than the check valves. The safety device comprises a differential piston disposed in a housing, which is actuated by the difference of pressure acted on a pair of opposite directionally positioned pressure receiving surfaces on it from each air reservoir, a neutral position retaining spring for constantly retaining the piston neutral, and a first and second cut-out valves which are alternatively closed by the shifting of the differential piston in either direction owing to occurrence of an imbalance of the pressure acted thereon to cut off the air route to one of the air reservoirs to suspend the air supply, when any one of the brake circuits is damaged, to the damaged side air reservoir, in order to maintain the other air reservoir in a normal function.

3 Claims, 7 Drawing Figures

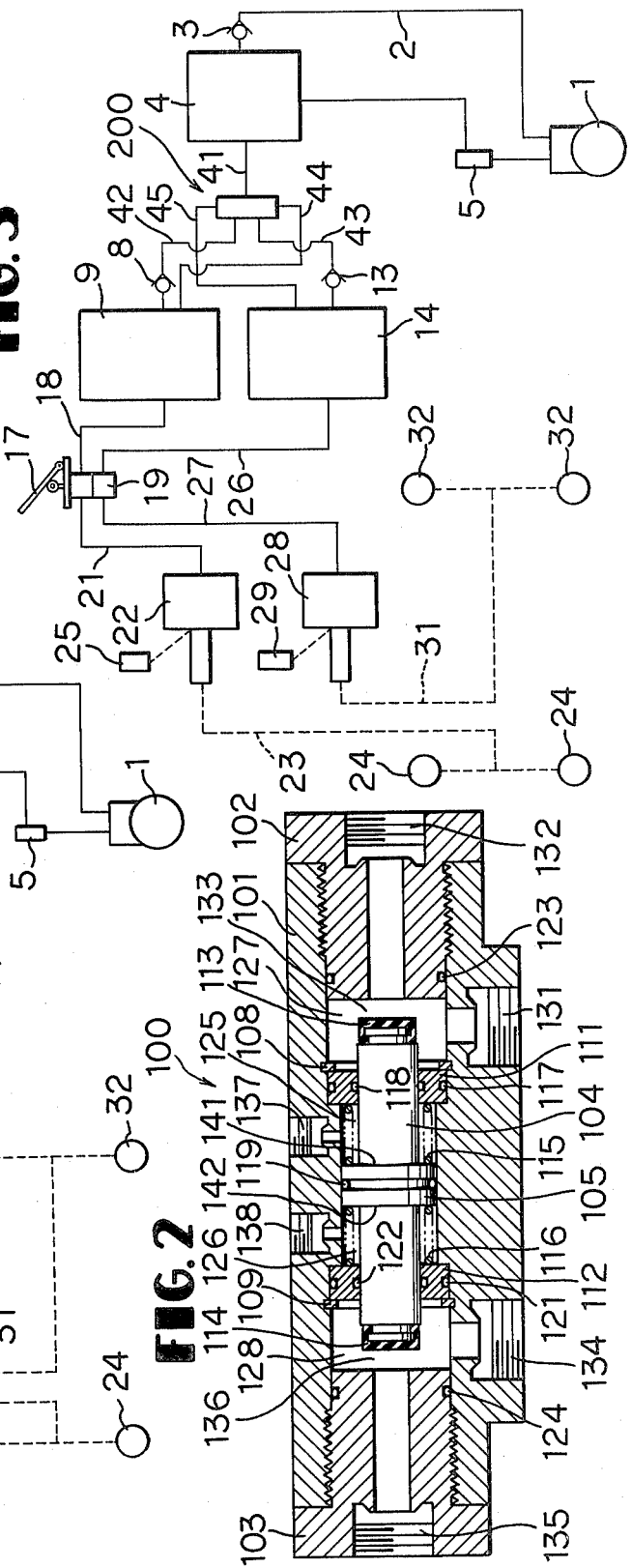
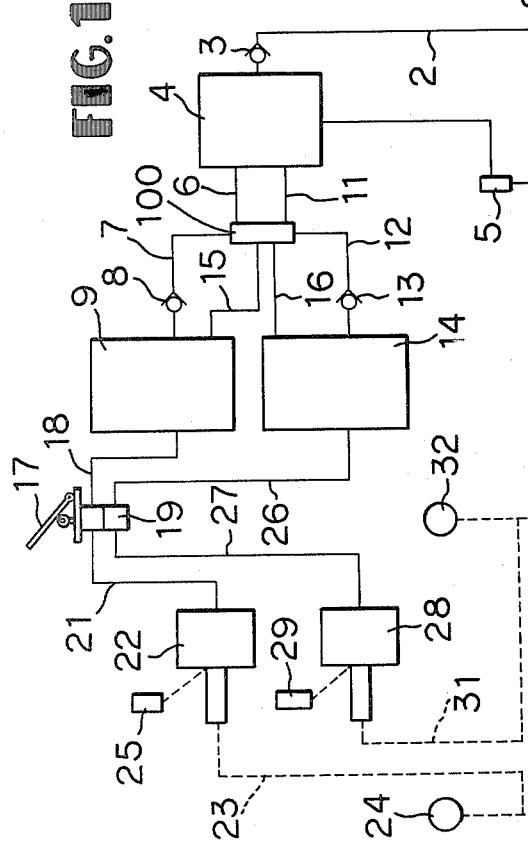
FIG. 3
FIG. 1
FIG. 2

SAFETY DEVICE FOR A DOUBLE-CIRCUIT TYPE AIR BRAKE FOR A VEHICLE

BACKGROUND OF THE INVENTION

The present invention relates to a safety device for a double-circuit type air brake system for a vehicle, wherein even when one circuit is damaged or trouble occurs therein the other circuit of the air brake system can continue to normally operate.

It is generally provided in a vehicle air brake system to reserve compressed air, produced in one compressor, in a pair of independent air reservoirs, and to actuate a double-circuit air brake system from the pressure source of the pair of air reservoirs. Such a pair of air reservoirs are usually of sufficient size for reserving compressed air needed for braking operations a few times in succession. Even when one circuit of the two gets into trouble (or is damaged), i.e., becomes incapable of braking operation due to insufficient air pressure, the other side circuit can still continue to work for braking the vehicle a few times to halt the same. It has been very effective in fact in enhancing the safety of a moving vehicle.

In such a conventional air brake system, the compressed air supplied from the compressor, in case of a damage in any one circuit, will leak out largely from the damaged portion of the disabled circuit, causing the other normal side circuit to be incorrectly supplied with compressed air, which results in speedy exhaust thereof and finally in a complete failure of brake operation.

For avoiding such a trouble, installation of a pressure gage in the brake circuit was commonly practiced to warn the driver of pressure falling below a predetermined value, and mounting of a warning lamp to alert the driver of the trouble was another way. The driver could repair the damaged portion or close a cock for air supplying in the damaged side circuit, upon once stopping the vehicle. A negligence (or overlooking) in watching the pressure gage or warning lamp, by any chance, would cause the driver to miss the timing of the repair or emergency countermeasure, leading to a critical danger.

SUMMARY OF THE INVENTION

This invention was made for eliminating the defects of the prior art set out above.

It is a primary object of this invention to provide a safety device for a double-circuit air brake system for a vehicle, wherein when either one of the circuits is damaged or trouble occurs therein, the air brake on the damaged side is automatically shut off from the compressor to prevent the compressed air supplied from the compressor from leaking out via the damaged portion any longer.

It is another object of this invention to provide a control valve for a double-circuit air brake system, which enables, when either one of the two circuits is damaged, the other circuit continues to operate normally.

It is further object of this invention to provide a safety device which is capable of exactly determining the pressure difference between a first and a second air reservoirs at the moment when the control valve (a cut-out valve) is closed.

It is still another object of this invention to fully attain the above-mentioned objects without significantly complicating the brake structure and consequently without significantly raising the manufacturing cost of the brake system.

In the safety device in accordance with this invention a safety means, specifically a safety valve, is installed, in a double-circuit air brake system, wherein compressed air produced in one compressor is divided into two paths and led to a first air reservoir and a second air reservoir, respectively through a first check valve and a second check valve, to actuate two independent air brakes, in the upstream portion of the air circuit, i.e., nearer to the compressor, than the first and second check valves, which safety device is composed of (1) a differential piston, having two opposite directionally positioned pressure receiving surfaces, being operated by the pressure difference between the pressure on a first pressure receiving surface from the first air reservoir and on a second pressure receiving surface from the second air reservoir; (2) a retaining means for constantly retaining the differential piston at a neutral position by means of its elasticity; (3) a first cut-out valve for cutting or shutting off the air route to the first air reservoir, when the differential piston is shifted from the neutral position due to the falling of pressure in the first air reservoir lower than the pressure in the second air reservoir exceeding a certain predetermined limit; and (4) a second cut-out valve for cutting the air path to the second air reservoir, when the differential piston is shifted from the neutral position due to the falling of pressure in the second air reservoir lower than the pressure in the first air reservoir exceeding a certain predetermined limit. This safety device is aimed at insertion of a safety means, i.e., a safety device in the air circuit of the brake system for enabling, when any one of the two brake circuits is damaged, the other normal one to be supplied with compressed air as usual, by means of shutting off the damaged side circuit from the compressor. Besides, in this safety valve, the air pressure in the first and second air reservoirs, at the moment when one of the cut-out valves is closed, can be exactly determined, by means of employing a special spring means which, unlike an ordinary compression spring, is composed of a compression spring and a compression-spring-regulating means which is capable of compressing the compression spring to an exactly regulated length and producing a predetermined pre-load.

Other objects and features of this invention will be apparent to those skilled in the art from the following description of some specific embodiments of the inventive principles that will thereafter be pointed out in the claims.

BRIEF DESCRIPTION OF THE DRAWINGS

FIG. 1 is a circuit diagram of a double-circuit type air brake system including a first embodiment of this invention;

FIG. 2 is an elevational cross-section in enlargement of a safety valve shown in FIG. 1;

FIG. 3 is a circuit diagram of a double-circuit type air brake system including a second embodiment of this invention;

DETAILED DESCRIPTION OF THE PREFERRED EMBODIMENTS

Figure 4:
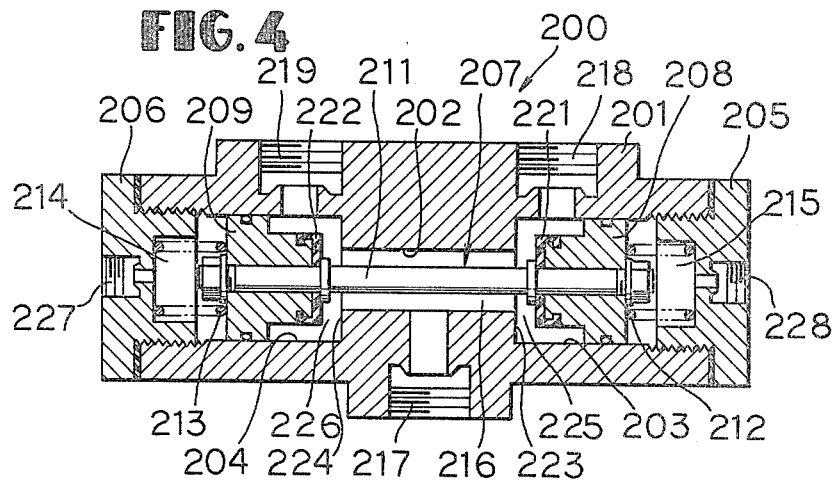
FIG. 4 is an elevational cross-section in enlargement of a safety valve shown in FIG. 3.

In a diagram of the air brake circuit shown in FIG. 1, numeral 1 designates a compressor, and compressed air produced therein is delivered, through a piping 2 and a check valve 3, to a wet tank 4. The compressed air of high temperature from the compressor 1 is cooled down in the wet tank 4 for removing the moisture by condensing. A pressure regulator 5 functions to release a suction valve of the compressor 1, when the pressure in the wet tank 4 is raised to a predetermined value, to stop the supply of the compressed air from the compressor 1.

The compressed air removed of moisture in the wet tank 4 is delivered through two paths, i.e., through a piping 6, a safety valve 100, a piping 7, and a check device 8 to a first air reservoir 9 on one hand, and through a piping 11, the safety valve 100, a piping 12, and another check valve 13 to a second air reservoir 14 on the other hand. The pressure in the air reservoirs 9 and 14 are respectively, through a piping 15 and a piping 16, led back or fed back to the safety device 100. The internal structure of the safety device 100 will be described later.

The compressed air (air under pressure) reserved in the first air reservoir 9 once is, when a brake pedal 17 is depressed, delivered through a piping 18, an operating valve 19, and a piping 21 to an air booster 22, where it is converted to a hydraulic pressure for being further delivered through a piping 23 to the front wheel cylinders 24 to operate the front brake. The above route is generally called the front brake circuit. Numeral 25 designates a brake fluid reservoir.

The rear brake circuit is likewise constructed of a second air reservoir 14, a piping 26, an operating valve 19, a piping 27, an air booster 28, a brake fluid reservoir 29, a piping 31, and the rear wheel cylinders 32, etc.

Referring to FIG. 2, a safety device, being generally shown in an enlarged cross-section, has a housing 1, which is provided with a laterally-extending through bore. The through bore is closed on either end by a plug 102 and a plug 103, and fits therein a slidable piston 104, which is provided with a large diametered portion in the middle, in the central portion thereof. The piston 104 pierces through, on either end thereof, fixed rings 111, 112, which are respectively secured to the housing 101 with a fastening ring of C-form 108, 109, and is provided with a pair of secured valves 113, 114 on both tips of the same. The piston 104 is constantly held in a neutral position by means of elasticity of a pair of coil springs 115, 116. Between the housing 101 and the various parts, such as the piston 104, fixed rings 111, 112, and plugs 102, 103, is respectively sealed with a sealing ring, 117, 118, 119, 121, 122, 123, and 124, which forms four mutually independent (separated) chambers, i.e., a first pressure chamber 125, a second pressure chamber 126, a first air chamber 127, and a second air chamber 128.

Compressed air led through the piping 6 comes on one hand, through a port 131, into the first air chamber 127, and is delivered, through a port 132, to the first air reservoir 9. This route can be shut off (suspended) by a first cut-out valve 133 which is constructed by the valve 113 and the plug 102. On the other hand, compressed air led through the piping 11 comes, through a port 134, into the second air chamber 128, and is delivered, through a port 135, to the second air reservoir 14. This route can be shut off by a second cut-out valve 136, which is constituted by the valve 114 and the plug 103.

The piston 104 functions as a differential piston, which is operated by the pressure difference between the pressure on a first pressure receiving surface 141 and on a second pressure receiving surface 142 formed respectively on either side of the large diametered portion 105, because the pressure in the first air reservoir 9 is led, through a port 137, to the first pressure chamber 125 and the pressure in the second air reservoir 14 is led, through a port 138, to the second pressure chamber 126. The piston 104 is thus operated by the pressure difference, between the pressure acting on the first pressure receiving surface 141 and the pressure on the second pressure receiving surface 142, from either air reservoir 9 and 14.

While the pressure in the wet tank 4 and in the air reservoirs 9, 14 is all equal to the atmospheric pressure, as to a brake system of such a construction, the piston 104 is to be held in a neutral position by means of coil springs 115, 116, and the cut-out valves 133, 136 are all naturally in an open status.

Operation of the compressor 1 in this status will deliver compressed air through the wet tank 4 and the safety device 100 to both air reservoirs 9, 14 to raise the pressure therein. As soon as the pressure in the wet tank 4 reaches a predetermined value, it can be sensed (detected) by the air regulator 5 to cause the suction valve of the compressor 1 to be released, which renders the compressor 1 idle to stop the supplying of air.

Now the brake system is ready to operate. A depressing of the brake pedal 17 will open the operating valve 19 to deliver the compressed air into the air boosters 22, 28. The air pressure will be converted here into hydraulic pressure to actuate the wheel cylinders 23, 32, for performing the brake operation. When the pressure in the air reservoirs 9, 14 falls down due to the brake operation, fresh compressed air is induced from the wet tank 4 to compensate it. In such a way the pressure in the first and second air reservoirs 9, 14 is maintained at an almost constant level, being substantially equal to each other, so long as the front and rear brake systems are both normal.

Assume that a trouble (damage) happened in the air circuit to the front brake, the compressed air will leak from the damaged portion to lower the pressure in the first air reservoir 9 due to the flowing out of the air. It will of course lower the pressure in the wet tank 4; however, the pressure in the second air reservoir 14 is maintained as it is, as the check valve 13 prevents the reverse flow of the air. Difference of pressure between in the first air reservoir 9, which has fallen down, and in the second air reservoir 14, which has been maintained, becomes very great, which in turn makes the difference of pressure in the first and second pressure chambers great, because either of them is communicated with the first and second air reservoir respectively. The piston 104 is shifted of course in the pressure-lowered direction, i.e., toward the first pressure chamber 125. The valve 113 secured on the tip of the piston 104 will abut on the end surface of the plug 102 to shut off the route of the compressed air from the port 131 to the port 132.

The compressed air from the compressor 1 will not, in this status, be delivered to the first air reservoir 9, but only to the second air reservoir 14, which will continue to supply with the compressed air as it used to before the trouble occurrence to the front brake circuit. The rear brake circuit can be maintained in a normal operation status.

The above description on the trouble occurrence in the front brake circuit will hold true in the trouble happening in the rear brake circuit, because the safety device 100 is made completely symmetrical. That is, the front brake circuit will continue to work normally while the rear brake circuit is in trouble.

When the troubled side brake circuit has been repaired, releasing of the compressed air from the air reservoirs 9 and 14, until the pressure comes down to the atmospheric pressure, will render the pressure in the first and second pressure chambers 125, 126 in the safety device 100 equal to the atmospheric pressure, restoring the piston 104 to the neutral position with the aid of the elasticity of the coil springs 115, 116. It causes the cut-out valve 133 (or 134), which has been closed, to open again for making the safety valve 100 inoperative.

As described in detail in the above, the safety device 100 in this embodiment is sufficiently effective, simply by virtue of its installations when any one of the brake circuits is damaged, in maintaining the normal side air brake operative as it is, while automatically suspending the air flow of the troubled side brake circuit. Another important merit of this invention lies in that the restoration of the safety device 100 to the normal status, wherein the piston 104 is in a neutral position, is quite easy, when the damaged circuit has been repaired. As earlier stated, all that has to be done for the restoration of the safety device 100 to the normal inoperative status is to release the compressed air of the air reservoirs 9 and 14.

A second embodiment is illustrated in FIGS. 3 and 4, principal difference of which from the previous one lies in the structure of the safety device 200, as compared with safety device 100. Except for some resultant differences in the piping arrangement, most parts are identical to the first embodiment; lengthy description will be omitted by allotting like numerals to like parts.

The safety device 200 in this embodiment is concurrently a three-way joint; the compressed air led from the wet tank 4 by a single piping 41 to the safety valve 200 is divided into two within the safety valve 200 for being delivered to the air reservoirs 9, 14 through pipings 42 and 43. The pressure in the air reservoirs 42, 43 is respectively fed back to the safety device 200 through pipings 44, 45.

The housing 201 of the safety device 200 is, as shown in FIG. 4, provided with a through bore which is composed of a small diametered portion 202 in the middle and large diametered portions 203, 204 on either end. Openings on both large diametered portions 203, 204 are respectively closed by a plug 205, 206.

The piston 207 is slidably fitted in the housing 201, being composed of a rod 211 in the middle portion thereof and a pair of heads 208, 209 attached on each end portion of the rod 211, and being normally maintained in the neutral position, by means of a pair of coil springs 212, 213 disposed between each head 208, 209 and each plug 205, 206 respectively. The vacant space in the housing 201 is divided by the insertion of the piston 207 into three, i.e., the first pressure chamber 214, the second pressure chamber 215, and the central air chamber 216.

The compressed air led through the port 217 into the central air chamber 216 is divided into two therein, one is led, via the port 218, to the first air reservoir 9, the other being led, via the port 219, to the second air reservoir 14. These two air routes can be respectively shut off by the first and second cut-out valves 225, 226, which are respectively composed of a valve 221 (222) secured on the head 208 (209) of the piston and a stepped portion 223 (224) formed inside the housing 201.

The piston 207 is, also in this case, actuated by the difference of pressure acting on it in both pressure chambers 214, 215, because the pressure in the first air reservoir 9 is fed back through the piping 44 and the port 227 to the first pressure chamber 214, and the pressure in the second air reservoir 14 is fed back through the piping 45 and the port 228 to the second pressure chamber 215.

When the front brake circuit is damaged, in this brake system, to lower the inside pressure of the first air reservoir 9, the pressure in the first pressure chamber 214 of the safety device 200 also falls down to shift the piston 207 toward the first pressure chamber 214, followed by closing of the first cut-out valve 225 to suspend the supply of compressed air to the first air reservoir 9. When the rear brake circuit is damaged to lower the inside pressure of the second air reservoir 14, the piston 207 is similarly shifted toward the second pressure chamber 215, followed by closing of the second cut-out valve 226 to cut off the second air reservoir 14 from the compressor 1.

This embodiment is advantageous, in addition to the same merit as the previous embodiment, in the possibility of eliminating one piping between the wet tank 4 and the safety device 200, because the safety device 200 in this case is a three-way joint which is capable of dividing the air path into two by itself.

Figure 5:
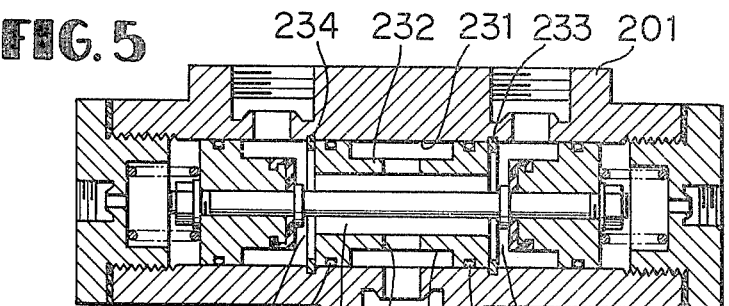
FIG. 5 is an elevational cross-section in enlargement of a safety valve in a third embodiment of this invention.

A third embodiment is explained, with reference to FIG. 5. This embodiment is aimed at facilitation of machining of the safety device 200 shown in FIG. 4. In the embodiment of FIG. 4 the through bore of the housing 201 is provided with a small diametered portion 202 in the middle, which makes the machining of the large diametered portions 203, 204 on either side difficult. In this embodiment the through bore 231 is of straight form as can be seen in FIG. 5 for facilitating the machining thereof. By way of compensation, a cylindrical member 232 is placed in the middle of the through bore 231, being secured by a pair of C-form fastening rings 233, 234. The cylindrical member 232 serves as valve seats on either end for the cut-out valve 225, 226. This cylindrical member is provided with on the outer periphery thereof an annular recess 235, and a communicating bore 236 for connecting the recess 235 to the central air chamber 216. As a pair of sealing rings 237, 238 ensure the air-tightness between the cylindrical member 232 and the housing 201, the cylindrical member 232 makes the performance of the through bore 231 in this embodiment identical to the through bore in the second embodiment with a small diametered portion 202. Other parts are entirely identical to the previous embodiment, requiring no further explanation.

Figure 6:
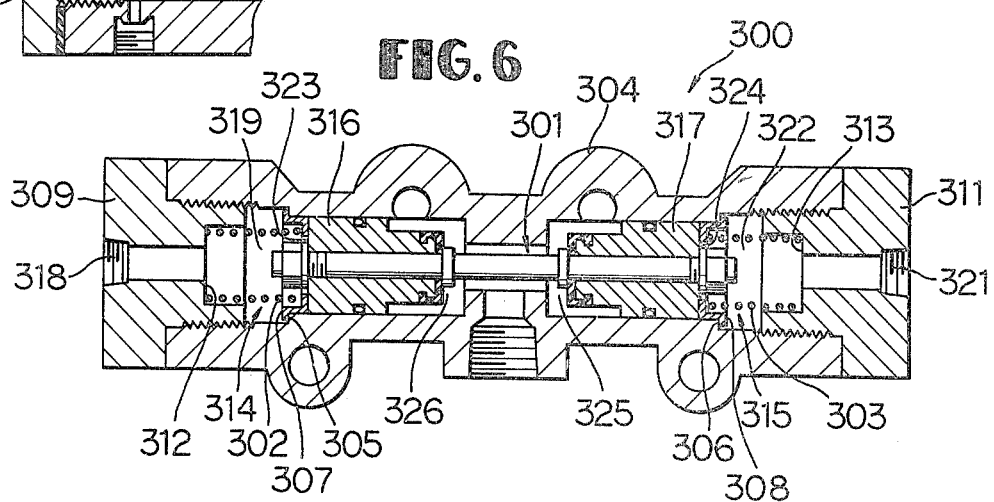
FIG. 6 is an elevational cross-section in enlargement of a safety valve including a spring seat in a fourth embodiment of this invention.

A fourth embodiment of the safety valve will be described with reference to FIG. 6. Comparing with the safety device 200 in FIG. 4, only different parts will be elaborated, omitting the description for the identical portions. The greatest feature of this safety device 300 lies in its spring means 314 (315), which are composed of respectively on either side of the piston 301, a coil spring 302 (303), a movable spring seat 307 (308) seated on a stepped portion 305 (306) of the housing 304 for constantly receiving one end of the coil spring 302 (303), and a fixed spring seat 312 (313) formed on the plug 309 (311). The piston 301 is retained in a neutral position, having on either end a small gap between the spring seat 307 (308) and the piston head 316 (317). It is substantially possible to substitute this embodiment for the safety device 200 in FIG. 3 wherein the pressure in the first air reservoir 9 is led, through the piping 44 and the port 318, to the first pressure chamber 319, and the pressure in the second air reservoir 14 is led, through the piping 45 and the port 321, to the second pressure chamber 322. The piston 301 consequently receives the pressure from the first air reservoir 9 and the second air reservoir 14 respectively on the first pressure receiving surface 323 and the second pressure receiving surface 324; it functions as a differential piston, which is actuated by the pressure difference between the pressure acting on the first pressure receiving surface 323 and the second pressure receiving surface 324, whenever the difference of the pressure applied on either pressure receiving surface surpasses the pre-loaded amount of the coil spring 302 (303).

Because of disposing a spring seat 307 (308), the set length of the coil spring 302 (303), in this embodiment, can be determined far more exactly and in comparison with an ordinary spring installation without a spring seat. It means that this piston 301 can be retained in a neutral position far more exactly than an ordinary piston which is retained neutral only by the balance of two coil springs without a seat.

This characteristic design of the safety valve 300 brings about several merits such as (a) diminishing of the lift amount of the cut-out valve 325 (326) is possible; (b) pressure difference between the first air reservoir 9 and the second air reservoir 14, when the cut-out valve 325 (326) is closed, can be exactly determined in advance, since the piston 301 is a differential piston, which is actuated, only when the pressure difference between the two air reservoirs surpasses the set value of the coil spring 302 (303), to close the cut-out valve 325 (326); (c) spring constant and piston stroke may be comparatively small, so long as a desired pre-load is imparted to the spring, when it is disposed, because the pressure difference between the two air reservoirs for actuating the piston balances with the pre-loaded force amount of one spring, not with the difference of load between the two springs 212, 213 as in the safety valve 200 in FIG. 4, which enables the scale down of the spring and other parts; and (d) only the disposition of the spring seat characteristically enhances the performance of this type safety device.

Figure 7:
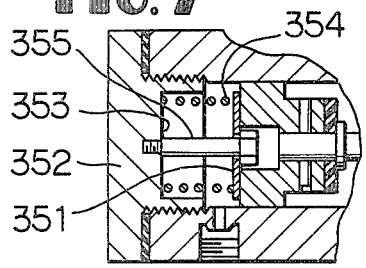
FIG. 7 is an elevational cross-section in enlargement of a safety valve including another spring seat in a fifth embodiment of this invention.

Finally, a fifth embodiment will be briefly described with reference to FIG. 7. The spring means 324 (315) in FIG. 6 is displaced herein by another means, which being composed of a spring seat 351, a position-fixed spring seat 353 formed on the plug 352, a coil spring 354, and a bolt 355 which slidably supports the spring seat 351 for preventing extension of the coil spring 354 exceeding a certain limit.

All of the above-mentioned embodiments are applications of this invention to a brake system, wherein air pressure is, with the aid of the air booster, converted into hydraulic pressure. It is of course possible to apply this invention to a so-called full air brake, which does not convert the air pressure into the hydraulic pressure.

The application of this invention is not limited to the front and rear type double-circuit brake system, as illustrated in this specification. It may also be applied to any other type circuit, for example, a diagonal type circuit.

All of the embodiments are disclosed only for example. So this invention should not be construed to be limited to those embodiments. Modifications and alterations may occur within the scope and spirit of the following claims.

What is claimed is:

1. A safety device for double-circuit type air brake system used in a vehicle, wherein compressed air supplied from one compressor is delivered to a first air reservoir and a second air reservoir respectively through a first check valve and a second check valve, and said first air reservoir and said second air reservoir are used as pressure sources to respective first and second mutually independent air brake circuits, the safety device compresing:

a housing having a stepped bore which is composed of a small diametered bore in its middle portion and large diametered bores on both sides thereof, said compressor being connected to the small diametered bore, and said first reservoir and said second air reservoir being respectively connected to said large diametered bores;

a piston composed of a rod portion and a pair of piston heads disposed on respective ends of said rod portion, said piston heads being respectively slidable and air-tightly fitted in respective said large diametered bores of said housing, each inner end face of said piston heads and each stepped portion formed between said small diametered bore and said large diametered bores constituting a pair of cut-out valves for respectively and alternatively shutting off air flow from said compressor to said first reservoir and to said second reservoir when said piston is shifted from its neutral position;

neutral position retaining means including spring means for retaining said piston in the neutral position by resilient force of said spring means; and pressure feed back means for feeding back pressure in said first air reservoir and in said second air reservoir respectively to each outer and surface of said piston heads, whereby when either one of said first and second brake circuits is damaged, said piston is shifted from the neutral position by pressure difference acting on said outer end surfaces for shutting off the damaged one of said brake circuits from said compressor.

2. A safety device as set forth in claim 1, wherein said stepped bore is formed by fitting a cylindrical member stationarily and air-tightly into a middle portion of a straight bore formed in said housing, a through bore formed in said cylindrical member constituting said small diametered bore, end surfaces of said cylindrical member constituting said stepped portions.

3. A safety device as set forth in claim 1, wherein said neutral position retaining means is composed of a pair of compression springs disposed on either side of piston and compression-spring-regulating means for compressing each of said compression springs in order to exactly regulate the length thereof and generating a predetermined pre-load, said pair of compression springs constituting said spring means.

* * * * *